United States Patent [19]
Achleitner et al.

[11] Patent Number: 5,617,720
[45] Date of Patent: Apr. 8, 1997

[54] METHOD FOR CONTROLLING THE FUEL SUPPLY FOR AN INTERNAL COMBUSTION ENGINE WITH A HEATABLE CATALYTIC CONVERTER

[75] Inventors: Erwin Achleitner, Regensburg; Achim Koch, Tegernheim, both of Germany

[73] Assignee: Siemens Aktiengesellschaft, Munich, Germany

[21] Appl. No.: 641,289

[22] Filed: Apr. 30, 1996

Related U.S. Application Data

[63] Continuation of PCT/DE95/01174, Aug. 31, 1995.

[30] Foreign Application Priority Data

Aug. 31, 1994 [DE] Germany .......................... 44 30 965.1

[51] Int. Cl.⁶ .................................................. F01N 3/20
[52] U.S. Cl. ................. 60/274; 60/284; 60/286; 60/289; 60/300
[58] Field of Search ............................. 60/284, 286, 289, 60/300, 274

[56] References Cited

U.S. PATENT DOCUMENTS

| | | | |
|---|---|---|---|
| 3,696,618 | 10/1972 | Boyd | 60/286 |
| 3,945,204 | 3/1976 | Knapp | 60/286 |
| 4,615,173 | 10/1986 | Usui | 60/286 |
| 5,353,591 | 10/1994 | Kabasin | 60/286 |
| 5,417,059 | 5/1995 | Hartel | 60/276 |

FOREIGN PATENT DOCUMENTS

| | | |
|---|---|---|
| 0499207 | 8/1992 | European Pat. Off. . |
| 2719252 | 8/1978 | Germany . |
| 4132814 | 4/1993 | Germany . |
| 4239081 | 5/1994 | Germany . |
| 4241494 | 6/1994 | Germany . |
| 4408769 | 9/1995 | Germany . |
| 91/13247 | 9/1991 | WIPO . |
| 92/14912 | 9/1992 | WIPO . |
| 92/22734 | 12/1992 | WIPO . |

*Primary Examiner*—Douglas Hart
*Attorney, Agent, or Firm*—Herbert L. Lerner; Laurence A. Greenberg

[57] ABSTRACT

An internal combustion engine is equipped with a lambda regulating device, a catalytic converter disposed in an exhaust pipe of the internal combustion engine, a device for externally heating the catalytic converter to its operating temperature, and a secondary-air pump which injects additional air into the exhaust pipe. A method for controlling the fuel supply for the internal combustion engine includes injecting an additional fuel quantity during operation of a burner and during secondary-air injection, for heating the catalytic converter, as a function of engine air mass flow and an additional secondary-air quantity which is injected into the exhaust system.

14 Claims, 2 Drawing Sheets

METHOD FOR CONTROLLING THE FUEL SUPPLY FOR AN INTERNAL COMBUSTION ENGINE WITH A HEATABLE CATALYTIC CONVERTER

CROSS-REFERENCE TO RELATED APPLICATIONS

This application is a Continuation of International Application Serial No. PCT/DE95/01174, filed Aug. 31, 1995.

BACKGROUND OF THE INVENTION

FIELD OF THE INVENTION

The invention relates to a method for controlling the fuel supply for an internal combustion engine being equipped with a lambda regulating device, a catalytic converter disposed in an exhaust pipe of the internal combustion engine, a device for externally heating the catalytic converter to its operating temperature, and a secondary-air pump which injects additional air into the exhaust pipe.

It is known that the emission of harmful substances from an internal combustion engine can be reduced effectively by catalytic aftertreatment. In that case, a three-way catalytic converter in conjunction with a lambda regulating device has proved to be a high-performance concept for the aftertreatment of exhaust gas. The emission of harmful substances from an internal combustion engine is greatest in the cold-starting phase. The reason therefor is that the still cold catalytic converter can perform its function as a converter of harmful substances only when it has reached its so-called start-up temperature (light-off temperature) of around 300° C. In the normal travel mode that takes, on average, one minute to two minutes, but appreciably longer in city traffic due to the low engine load and the consequently lower exhaust gas temperature. Various measure have already been disclosed for reducing that time, after which virtually complete conversion of the exhaust gas constituents HC, CO and $NO_x$ takes place.

Thus, it is known from German Published, Non-Prosecuted Patent Application DE 27 19 252 to heat the catalytic converter of an internal combustion engine electrically. However, since the catalytic converter has a considerable size and mass, it is necessary, for heating which is to take place in a short time, to have a very high heating power and therefore a high current demand which, when the internal combustion engine is used in an automobile, exceeds the capacity of the automobile current supply system.

A secondary-air system can be seen from the publication entitled: PIERBURG Produktinformation "Elektrische Sekundaerluftpumpe" [PIERBURG Production Information "Electric Secondary-air pump"], No. 5/400-151.01,9/91 published at the International Automobile Exhibition, Frankfurt/Main, 1991. That system, in an internal combustion engine, provides the injection of secondary air into the exhaust manifold during the cold, not yet operational phase of the catalytic converter.

That ensures that the harmful substances CO and HC, which occur to an increased extent in the cold phase as a result of an engine-side air coefficient of lambda <1, are reduced and heat is supplied to the catalytic converter in order to achieve more rapid operational readiness after the cold start. The secondary-air injection system is formed of an air pump, one or more non-return valves and a cutoff valve.

It is known from German Published, Non-Prosecuted Patent Application DE 41 32 814 A1, in connection with such a secondary-air system, to heat the catalytic converter to operating temperature through the use of a burner which is operated with fuel of the internal combustion engine and reacts to control signals from a control unit. In that case, the heating power is at maximum immediately after the starting of the engine and can be controlled as a function of the temperature of the catalytic converter and/or of the lambda probe.

SUMMARY OF THE INVENTION

It is accordingly an object of the invention to provide a method for controlling a fuel supply for an internal combustion engine equipped with an externally heated catalytic converter, which overcomes the hereinafore-mentioned disadvantages of the heretofore-known methods of this general type in such a way as to obtain as short a heating time of the catalytic converter as possible, without a running capacity of the internal combustion engine being impaired thereby.

With the foregoing and other objects in view there is provided, in accordance with the invention, a method for controlling the fuel supply for an internal combustion engine having an intake duct, an exhaust system having an exhaust pipe, a lambda regulating device associated with the exhaust pipe, a catalytic converter being disposed in the exhaust pipe and having a combustion process and an operating temperature, a device for externally heating the catalytic converter to the operating temperature, and a secondary-air pump for injecting additional air into the exhaust pipe, which comprises supplying an additional fuel quantity to the combustion process of the internal combustion engine during the external heating of the catalytic converter; and determining the additional fuel quantity by a quotient of the additional secondary-air quantity being injected into the exhaust system by the secondary-air pump and from an air mass flow entering the intake duct of the internal combustion engine.

In accordance with another mode of the invention, there is provided a method which comprises injecting the additional air into the exhaust pipe upstream of a lambda probe of the lambda regulating device and upstream of the catalytic converter of the internal combustion engine, with the secondary-air pump.

In accordance with a further mode of the invention, there is provided a method which comprises supplying fuel from a fuel circuit of the internal combustion engine and combustion air from the secondary-air pump to a burner system of the device for external heating, and placing a combustion chamber of the burner system in the exhaust pipe near an inlet of the catalytic converter.

In accordance with an added mode of the invention, there is provided a method which comprises supplying an electric heating device of the device for externally heating the catalytic converter from an automobile power supply of the internal combustion engine or from an external current source.

6. In accordance with an additional mode of the invention, there is provided a method which comprises correcting the additional fuel quantity by at least one of a warm-up correction factor and a cold-restarting factor.

In accordance with yet another mode of the invention, there is provided a method which comprises limiting the additional fuel quantity in at least one of an idling mode and a partial-load mode of the internal combustion engine, to a limit value dependent on a coolant temperature.

In accordance with yet a further mode of the invention, there is provided a method which comprises switching on the secondary-air injection during starting of the internal combustion engine and switching off the secondary-air injection after a selectable time.

In accordance with yet an added mode of the invention, there is provided a method which comprises selecting the selectable time as a function of a coolant temperature during starting of the internal combustion engine.

In accordance with yet an additional mode of the invention, there is provided a method which comprises switching off the secondary-air injection when a temperature of the catalytic converter exceeds a limit value.

In accordance with again another mode of the invention, there is provided a method which comprises terminating the injection of the additional fuel quantity when the secondary-air injection is switched off.

In accordance with again a further mode of the invention, there is provided a method which comprises suppressing the lambda regulating device during the secondary-air injection and switching on the lambda regulating device after a lapse of a selectable dead time after switching off the secondary-air injection.

In accordance with again an added mode of the invention, there is provided a method which comprises correcting the additional secondary-air quantity by an altitude factor.

In accordance with a concomitant mode of the invention, there is provided a method which comprises correcting the additional secondary-air quantity by a battery voltage correction.

Other features which are considered as characteristic for the invention are set forth in the appended claims.

Although the invention is illustrated and described herein as embodied in a method for controlling the fuel supply for an internal combustion engine with a heatable catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
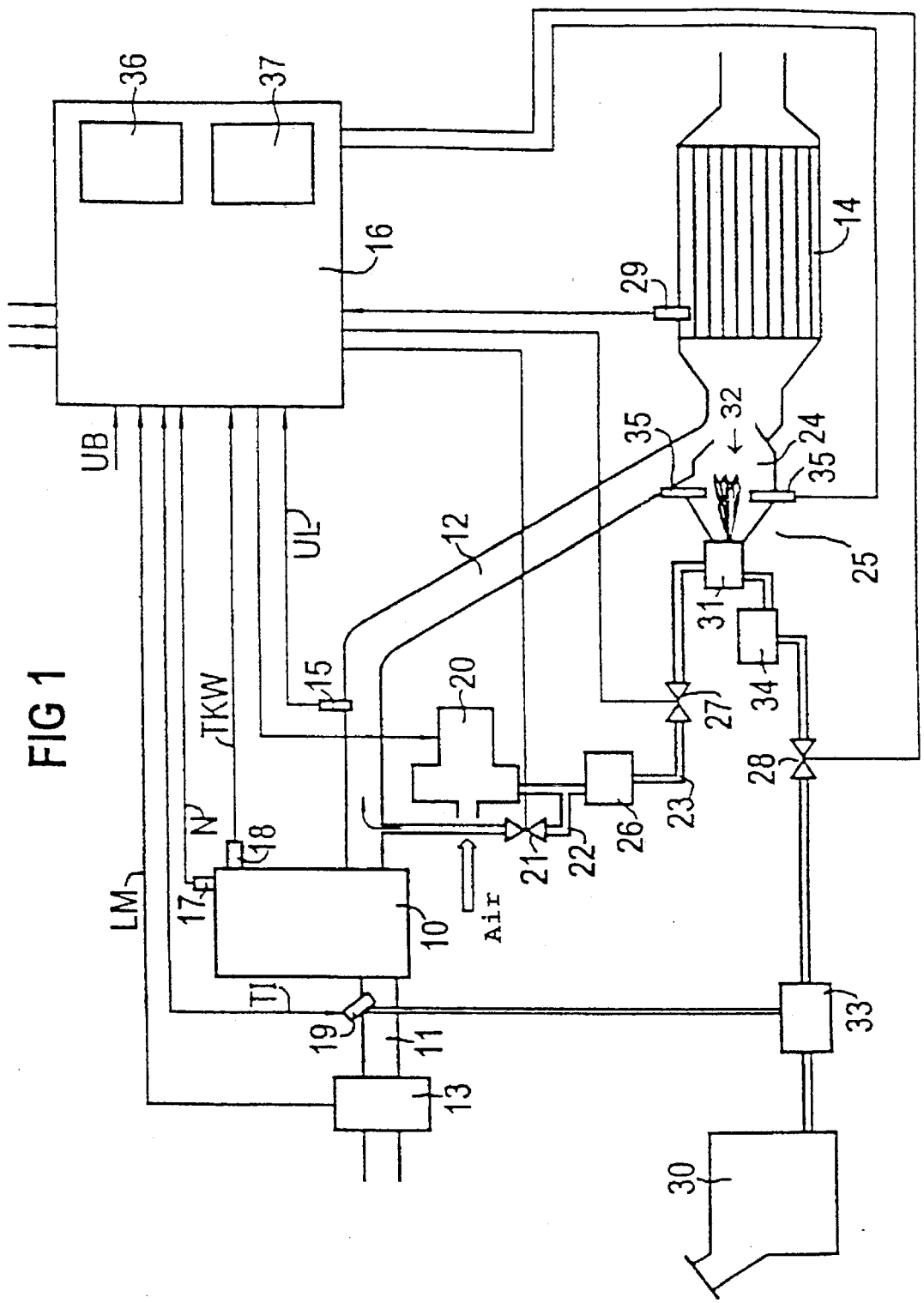
FIG. 1 is a simplified schematic and block circuit diagram of an internal combustion engine with a catalytic converter which can be heated through the use of a burner system and in which the method according to the invention is employed.

Referring now in detail to the figures of the drawings, in which only those parts that are necessary for understanding the method according to the invention are shown, and first, particularly, to the simplified schematic and block circuit diagram of FIG. 1 thereof, it is seen that reference symbol 10 indicates an internal combustion engine with an intake pipe 11 and an exhaust pipe 12. Air which is necessary for combustion of a mixture in the cylinders of the internal combustion engine 10 is determined by an air mass meter 13 disposed in the intake pipe 11. The air mass meter can be constructed as a hot-wire air mass meter or as a hot-film air mass meter. An oxygen sensor is inserted in the exhaust pipe 12, upstream of a three-way catalytic converter 14 serving for converting the constituents HC, CO and $NO_x$ contained in the exhaust gas of the internal combustion engine. The oxygen sensor is in the form of a lambda probe 15 which emits an output signal UL to an electronic control device 16 of the internal combustion engine 10 as a function of an oxygen concentration in the exhaust gas. Furthermore, a sensor 17 for recording an engine speed or rpm N and a coolant temperature sensor 18 are also provided at suitable locations of the internal combustion engine. Outputs of the sensors are connected through interfaces to corresponding inputs of the electronic control device 16 for the internal combustion engine 10. Such electronic control devices for internal combustion engines which, in addition to fuel injection, can also perform a multiplicity of further tasks (such as ignition regulation), are known per se, so that only the construction and mode of operation connected with the present invention are discussed below. The essential part of the electronic control device 16 is a microcomputer which controls the necessary functions according to a fixed program. In a so-called air mass managed engine control, a fundamental injection time or basic injection time TIB is calculated through the use of a signal representing an intake air mass LM and the signal representing the engine speed N supplied by the sensors (air mass meter 13 and engine speed sensor 17) and is processed in corresponding circuits. Corrections of this basic injection time are carried out, as a function of further operating parameters (such as the pressure and temperature of the intake air, the temperature of the coolant, the battery voltage, etc.), in such a way that, as a rule, through the use of the lambda regulation, a fuel/air mixture corresponding to the stoichiometric ratio ($\lambda=1$) is achieved. The injection quantity thus calculated is injected into the intake pipe 11 over an opening period (total injection time TI) of one or more injection valves 19.

An electrically operated air pump 20, which as a rule is constructed as a secondary-air pump, draws or sucks in fresh air through a non-illustrated air pipe. If required, the air pump 20 conveys this additional air both through a secondary-air pipe 22 having a metering valve 21 into the exhaust pipe 12 of the internal combustion engine 10, and through a burner air pipe 23 to a burner system 25 serving for the external heating of the exhaust gas catalytic converter 14. The quantity of secondary air can be controlled through the metering valve 21 either statically or through the use of a pulse duty factor. A pressure regulator 26 and a burner air cutoff valve 27 are inserted into the burner air pipe 23. The burner system 25, which is operated with the fuel of the internal combustion engine 10, is formed essentially of a combustion chamber 24 with a burner nozzle 31 and an ignition device 32. The burner air conveyed by the secondary-air pump 20 and the fuel provided from a fuel circuit of the internal combustion engine (a fuel tank 30 and a fuel distributor rack 33), through a fuel cutoff valve 28 and a fuel regulator 34, are supplied to the burner nozzle 31. The ignition device 32 includes ignition electrodes 35 which extend into the combustion chamber 24 and are ignited through the use of ignition pulses from the electronic control device 16. Activation of the individual valves (21, 27, 28) likewise takes place through signals from the electronic control device 16.

The burner is switched on only when the following starting conditions are satisfied:

no repeated starting, the coolant temperature is within a specific range during the starting of the internal combustion engine, a cold catalytic converter has been detected from the recognition of coolant temperature preheating.

In this case, any cooling water preheating which has taken place can be derived, for example, from a relation between the coolant temperature and the intake air temperature, as proposed in German Published, Non-Prosecuted Patent Application DE 44 08 769 A1.

Moreover, before the burner is switched on, there is an interrogation of the content of a diagnostic memory 36 which is present in the electronic control device 16 of the internal combustion engine and in which diagnostic faults of individual components of the burner system are filed.

Figure 2:
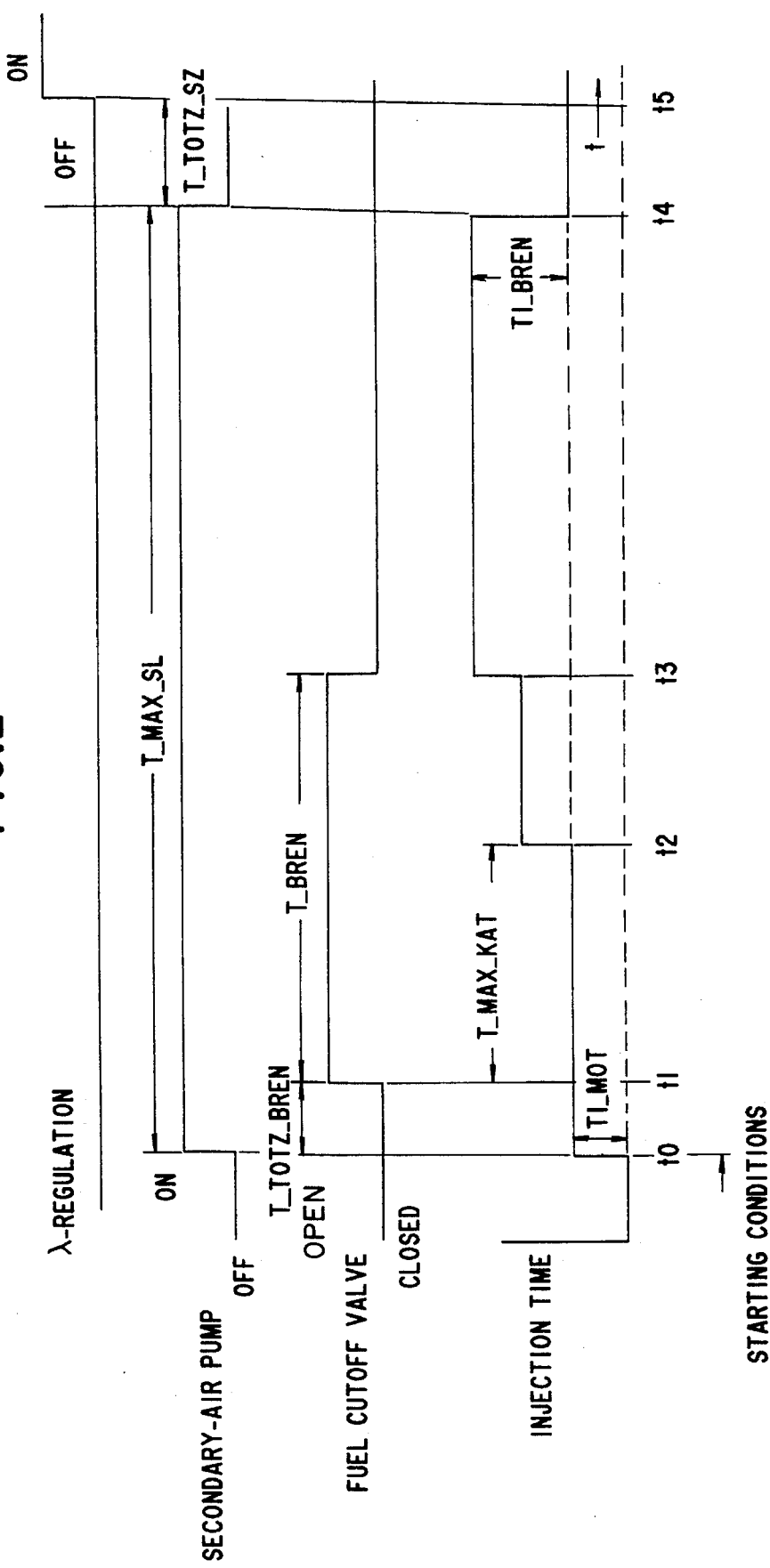
FIG. 2 is a diagram showing a selection of time-dependent signal trends during execution of the method.

When the conditions for starting the burner are satisfied, both the secondary-air pump 20 and the burner ignition are switched on at a time t0 shown in FIG. 2, through corresponding signals from the electronic control device 16. Since the secondary-air pump 20 has a particular startup time until the combustion air necessary for combustion is available in the combustion chamber 24, the fuel cutoff valve 28 is therefore switched on only after a time delay T_TOTZ_BREN, at a time t1 shown in FIG. 2. The burner then remains switched on for a time span T_BREN up to a time t3. After the time T_BREN since the commencement of the switching on (t0) of the secondary-air pump 20 has elapsed at the time t3 shown in FIG. 2, an end surface of the catalytic converter 14 is heated until the fuel supply is interrupted by closing the fuel cutoff valve 28.

If the intake air mass LM of the internal combustion engine 10 exceeds a fixed threshold value during this time T_BREN, then the burner is likewise switched off, since the operating reliability of the burner is no longer guaranteed at a high exhaust gas counterpressure.

Moreover, the fuel cutoff valve 28 is closed immediately and therefore the fuel supply to the burner is prevented when combustion misfires are detected or diagnostic faults in the ignition of the burner or in the lambda regulating device of the internal combustion engine are found.

This is intended, inter alia, to prevent fuel which cannot be burnt due to a defect, from being injected into the combustion chamber 24.

After the start of the burner (time t1), the internal combustion engine 10 is operated at an optimum lambda value (for low untreated HC emission) and with ignition time optimization in terms of consumption. A quantity of fuel is supplied according to an injection time TI_MOT through a mixture formation device, which is constructed in the exemplary embodiment as one or more of the injection valves 19.

After the catalytic converter has heated up in a front region, the further heating of the catalytic converter is assisted by mixture enrichment and, if appropriate, by an increase in the mass throughput of the internal combustion engine as a result of an ignition retardation. At the time t2, that is to say after a time T_MAX_KAT from the burner start has elapsed, the catalytic converter 14 has exceeded the startup temperature in the front, that is to say in a near-engine region, and the fuel cutoff valve 28 is closed through a corresponding signal from the electronic control device 16, but the burner air cutoff valve 27 remains open. This means that besides the secondary air which is conveyed into the exhaust pipe 12 by the secondary-air pump 20 through the secondary-air pipe 22, the combustion air of the burner is also injected as additional secondary air upstream of the catalytic converter 14.

The time T_MAX_KAT, within which the burner is switched on, is dependent on a coolant temperature TKW (indicated in FIG. 1) of the internal combustion engine 10 and is filed in a characteristic map of a characteristic map memory 37 of the electronic control device 16.

The secondary air-pump 20 is switched off either after a time T_MAX_SL (calculated from the start of the internal combustion engine 10) has elapsed or when the temperature in the catalytic converter 14 exceeds a predetermined limit value during the activation of the secondary-air pump 20. For this purpose, a temperature sensor 29 in a first monolith of the catalytic converter 14 serves for temperature measurement. The time T_MAX_SL is also dependent on a coolant temperature during starting TKW_ST and is likewise filed in a characteristic map of the characteristic map memory 37 of the electronic control device 16.

The lambda regulation is suppressed until the secondary-air pump 20 is switched off (at a time t4) so as not to influence the mixture composition during the heating of the catalytic converter 14. Subsequently, after a dead time T_TOTZ_SL until a time t5 has elapsed, the lambda regulation is switched on again.

Mixture enrichment as a result of a lengthening of the injection time is intended to assist a heating of the catalytic converter during the operation of the burner, that is to say during the time T_BREN, as well as after the cutoff of the fuel supply to the burner up to the switch-off time of the secondary-air pump 20 at the time t4.

In order to obtain good HC conversion, fuel enrichment by warm-up enrichment and the catalytic converter heating measures should only be so high that, overall, a lean mixture is obtained as a result of the secondary-air injection in the catalytic converter 14.

The additional mixture enrichment TI_BREN during the operation of the burner and after the burner has been switched off, but with the secondary-air pump 20 still switched on, is calculated as $$TI\_BREN = \frac{LM\_FAK\_BREN}{LM\_KG\_H}$$

in which LM_FAK_BREN is the additional secondary-air mass which is injected into the exhaust system through the use of the secondary-air pump, with the burner actively in operation, and LM_KG_H is the engine air mass flow which is determined by the air mass meter 13.

If further enrichment functions, such as warm up and/or cold restarting, are envisaged in the engine management, a factor TI_FAK_WL, which allows for warm up, and/or a factor TI_FAK_KNS, which allows for cold restarting, must also be subtracted from the value TI_BREN, in order to guarantee the satisfactory running capacity of the internal combustion engine.

The additional secondary-air mass LM_FAK_BREN, which is injected into the exhaust system, is obtained from a factor F_LM, which is filed in a characteristic map of the characteristic map memory 37 as a function of the engine air mass flow LM, and from a factor F_UB which takes into account a battery voltage UB of the automobile power supply and which consequently influences a delivery through the speed of the electrically operated secondary-air pump and, furthermore, is determined by the burner air mass LM_BREN:

$$LM\_FAK\_BREN = (F\_LM * F\_UB) - F\_LM\_BREN.$$

In order to take different pressure conditions at different altitudes into account, the combustion air of the burner and the secondary air are corrected as a whole through the use of an altitude factor FAK_PH which is obtained by sliding averaging and which reproduces the ratio of the actual intake air mass to the air mass of the engine under normal conditions (20° C., 1025 mbar).

An intake air temperature can likewise also be taken into account through a factor FAK_P_TKW. The factor F_LM_BREN for the burner air mass is taken into account in the above-mentioned formula only when the burner is still working, that is to say the fuel cutoff valve 28 is open during the time T_BREN.

The additional injection time for catalytic converter heating TI_BREN must be limited, so as not to impair the driveability of the automobile equipped with such a catalytic converter heating function and in order to prevent excessive enrichment, especially during idling, which may lead to overheating of the catalytic converter and to combustion misfires. For this purpose, different limit values, above which further enrichment no longer takes place, are fixed for the idling and partial-load load ranges. The limit values for the various load ranges are filed in a characteristic map of the diagnostic memory 37 of the electronic control device 16 as a function of the coolant temperature TKW.

In order to avoid causing any pronounced torque jumps, in the phase after starting, the enrichment can first be suppressed and subsequently be increased slowly through a time-dependent factor F_TI:

$$TI\_BREN\_ST = TI\_BREN * F\_TI.$$

Although the method has been described with reference to an example of an internal combustion engine with air mass managed engine control and with a fuel-operated burner system, it can also be employed for an internal combustion engine with a suction pipe pressure managed system and with a heatable catalytic converter, specifically irrespective of the type of heating device (for example, an electrically heated catalytic converter or a secondary injection alone) for the catalytic converter. In a suction pipe pressure managed system, the engine air mass LM_KG_H in the formula for calculating the additional injection time TI_BREN can be calculated from $$TI\_BREN = TI\_B * N * 14.5 * VD \ [mg/ms] * Z/2$$

in which TI_B denotes the basic injection time, N the engine speed or rpm, VD the valve throughflow of the injection valve and Z the number of cylinders.

We claim:

1. A method for controlling the fuel supply for an internal combustion engine having an intake duct, an exhaust system having an exhaust pipe, a lambda regulating device associated with the exhaust pipe, a catalytic converter being disposed in the exhaust pipe and having a combustion process and an operating temperature, a device for externally heating the catalytic converter to the operating temperature, and a secondary-air pump for injecting additional air into the exhaust pipe, which comprises:

supplying an additional fuel quantity to the combustion process of the internal combustion engine during the external heating of the catalytic converter; and determining the additional fuel quantity by a quotient of the additional secondary-air quantity being injected into the exhaust system by the secondary-air pump and from an air mass flow entering the intake duct of the internal combustion engine.

2. The method according to claim 1, which comprises injecting the additional air into the exhaust pipe upstream of a lambda probe of the lambda regulating device and upstream of the catalytic converter of the internal combustion engine, with the secondary-air pump.

3. The method according to claim 1, which comprises supplying fuel from a fuel circuit of the internal combustion engine and combustion air from the secondary-air pump to a burner system of the device for external heating, and placing a combustion chamber of the burner system in the exhaust pipe near an inlet of the catalytic converter.

4. The method according to claim 1, which comprises supplying an electric heating device of the device for externally heating the catalytic converter from an automobile power supply of the internal combustion engine.

5. The method according to claim 1, which comprises supplying an electric heating device of the device for externally heating the catalytic converter from an external current source.

6. The method according to claim 1, which comprises correcting the additional fuel quantity by at least one of a warm-up correction factor and a cold-restarting factor.

7. The method according to claim 1, which comprises limiting the additional fuel quantity in at least one of an idling mode and a partial-load mode of the internal combustion engine, to a limit value dependent on a coolant temperature.

8. The method according to claim 1, which comprises switching on the secondary-air injection during starting of the internal combustion engine and switching off the secondary-air injection after a selectable time.

9. The method according to claim 8, which comprises selecting the selectable time as a function of a coolant temperature during starting of the internal combustion engine.

10. The method according to claim 1, which comprises switching off the secondary-air injection when a temperature of the catalytic converter exceeds a limit value.

11. The method according to claim 1, which comprises terminating the injection of the additional fuel quantity when the secondary-air injection is switched off.

12. The method according to claim 1, which comprises suppressing the lambda regulating device during the secondary air injection and switching on the lambda regulating device after a lapse of a selectable dead time after switching off the secondary-air injection.

13. The method according to claim 1, which comprises correcting the additional secondary-air quantity by an altitude factor.

14. The method according to claim 1, which comprises correcting the additional secondary-air quantity by a battery voltage correction.

\* \* \* \* \*